United States Patent [19]
Krimm

[11] Patent Number: 5,320,126
[45] Date of Patent: Jun. 14, 1994

[54] PRESSURE RELIEVING DEVICE

[75] Inventor: Alexander Krimm, Oberhausen, Fed. Rep. of Germany

[73] Assignee: Hoechst Aktiengesellschaft, Fed. Rep. of Germany

[21] Appl. No.: 974,920

[22] Filed: Nov. 12, 1992

[30] Foreign Application Priority Data

Dec. 5, 1991 [DE] Fed. Rep. of Germany ....... 4140088

[51] Int. Cl.⁵ .............................................. F16K 17/40
[52] U.S. Cl. ................................ 137/68.1; 222/80
[58] Field of Search ................... 137/68.1, 69, 70, 71; 222/80, 347

[56] References Cited

U.S. PATENT DOCUMENTS

| | | | |
|---|---|---|---|
| 2,922,544 | 1/1960 | Hibbard | 137/68.1 |
| 3,685,686 | 8/1972 | Raidl | 220/89 A |
| 3,834,580 | 9/1974 | Ludwig | 137/68.1 |
| 3,922,767 | 12/1975 | Solter | 137/68.1 |
| 4,301,938 | 11/1981 | Wood | 137/68.1 |
| 4,434,905 | 3/1984 | Ou et al. | 220/89 A |
| 4,463,865 | 8/1984 | Mundt | 137/68.1 |

FOREIGN PATENT DOCUMENTS

5931 12/1979 European Pat. Off. .
3431795 3/1985 Fed. Rep. of Germany .

OTHER PUBLICATIONS

Soviet Inventions Illustrated, Section PQ, Week K40; Nov. 16, 1983 SU-A-976,188.

*Primary Examiner*—John C. Fox
*Attorney, Agent, or Firm*—Jordan B. Bierman

[57] ABSTRACT

A pressure relieving device having a pressure frame including a first portion and a second portion with a rupture disc clamped therebetween. Each frame portion contains a recess on its inner side which terminates at the sealing surface at the end face and serves to receive cutters, spacer discs, and/or terminating blocks.

7 Claims, 2 Drawing Sheets

PRESSURE RELIEVING DEVICE

This Application claims the priority of German Application P 41 40 088.7, filed Dec. 5, 1991.

The invention relates to a pressure relieving device comprising a two-part frame wherein the mutually opposite faces (sealing faces) thereof seal when joined together. Each frame part contains, on its inner side, a recess which terminates at the face, so that, when the frame parts are joined together, a channel is formed around the entire circumference of the frame. A rupture disc is clamped between the frame parts and the recesses on the inner sides of the frame parts are adapted to receive cutters, spacer discs, or terminating blocks (hereinafter sometimes called blocks).

BACKGROUND OF THE INVENTION

Pressure relieving devices comprising rupture discs and holders are known. They are usually fitted as prefabricated units in pipelines, vessels, reaction apparatus, and similar technical hollow bodies for protection against unacceptable pressure changes. The prefabrication of the pressure-relieving devices facilitates and speeds up their exchange in lines and apparatus and, in addition, ensures that the sensitive rupture discs do not suffer any damage due to improper handling, for example when being inserted into the holder.

It is also known to assist the tearing open of the rupture disc by the use of a tearing spike or a group of cutters. To ensure reliable bursting of the disc, the tearing device is located in the region of the disc center. A precise reaction to the given response pressure is achieved by changing the distance between the tearing spike or cutter edges and the plane of the disc. In a practical embodiment, the tearing device is set on a threaded rod. By variation of the distance between the spike or cutter edge and plane of the rupture disc, it is also possible to modify the pressure relieving device so it responds to other pressures without the necessity of changing the rupture disc. Finally, for special applications, the group of cutters can be arranged, not only on one side of the rupture disc, but on both sides, so that the pressure-relieving device is effective in both directions.

A disadvantage of the known pressure-relieving devices described above is that the hollow body surface area closed by the rupture disc is not cleared instantaneously around its entire circumference, even if a tearing device is used. If, for example, four cutter edges arranged in the form of a cross are used, the rupture disc is cut open segmentally. In particular in applications in which relief must take place at relatively low pressures, the complete tearing open of the rupture disc may be delayed in time and the unhindered flow of the medium leaving or entering may be impaired. In addition, the prior art mounting of the tearing device on a threaded rod is not always satisfactory, because the device is difficult to handle.

SUMMARY OF THE INVENTION

It is, therefore, the object of the invention to provide a pressure relieving device which, when undesired pressure changes occur, clears the entire surface area closed by the rupture disc immediately, without the advantages of known devices of the same generic type being lost or impaired.

This object is achieved by a pressure relieving device which comprises a two-part frame, with a rupture disc clamped between the parts, wherein each frame part contains a recess which terminates at the sealing face and is adapted to receive a cutter or a block. If a block is used, it preferably terminates at the sealing face.

The invention is distinguished by the fact that the cutter or cutters which initiate or assist the tearing open of the rupture disc act around its entire circumference. It is therefore not just scratched and initially partially split apart when an undesired pressure change occurs, but rather is cut out from the device around its entire circumference, so that the relief opening is immediately operative over its entire surface area; thus, building-up of a flow resistance by the ruptured rupture disc is eliminated. The pressure relieving device is simply adaptable to the most varied of requirements, responds to overpressure and/or underpressure, and is also quite suitable for use in the low pressure ranges.

A significant feature of the novel pressure relieving device is the recess present in one or both of the two frame parts. It extends around the entire circumference of each frame part and serves to receive cutters, spacer discs, and/or blocks. The cutters, designed in the shape of the frame parts, function to cut out the rupture disc. For setting to a certain rupture pressure, the distance of the cutters from the plane of the rupture disc can be changed simply by inserting spacer discs. This dispenses with the complex and adjustment-sensitive device using a threaded rod.

By using cutters in only one frame half, the pressure relieving device is effective only in the event of either a pressure increase or a pressure decrease. An embodiment of the device according to the invention in which both frame parts are provided with cutters can accordingly be used if it is intended to avoid both a certain overpressure and a certain underpressure.

In order to prevent the cut-out rupture disc from being carried away by the fluid medium and becoming lodged in the relief line, it may be advisable to blunt the cutter edge over a small portion of the circumference. Then the relief opening is indeed cleared around the entire circumference, but the rupture disc is retained in the pressure relieving device by means of a tab formed of the circumferential portion which is not cut through.

If only one frame half is equipped with a cutter, the opposite half is provided with a block. It terminates flush with the sealing face and forms a flat surface area therewith. Finally, the recesses of both frame parts may also be provided with blocks, so that the device according to the invention can also be used if, in a specific case, a tearing device is not required.

The plane defined by the cutter edges preferably runs parallel to the plane of the rupture disc, i.e. the edges meet the plane at an angle of 90°. However, depending on the application, it may be expedient to incline the plane of the cutter edges with respect to the plane of the rupture disc, so that the angle between plane and cutter edge is greater than or less than 90°.

The rupture disc is clamped between the frame parts. The clamping is performed in a known way, for example with the aid of a number of screwbolts which are circumferentially disposed at intervals on the frame. Rupture discs of the most diverse types and of all materials which are usually used for the production of such discs can be used in the novel pressure relieving device. If appropriate, allowance can be made for the different materials by selection of the cutters, for example with regard to material or inclination of the cutter edge.

In an extreme case, cutting fails to take place due to the material of the disc bulging and creeping over the cutter edge. To overcome the problem, it has proved particularly successful to provide the rupture discs, especially those of plastic, with a predetermined weakened breaking point adjacent the periphery of the cutter or cutters. This measure ensures that, on contact of the disc by the cutter, the cutting operation is performed instantaneously and is not delayed. The predetermined weakened breaking point may be impressed in the rupture disc already during production; however, it is preferably produced by the cutter itself after fitting it into the pressure relieving device.

Various embodiments of the pressure relieving device according to the invention are explained in more detail below with reference to the attached drawings, wherein like reference characters indicate like parts FIG. 1 is a cross section of a pressure relieving device with a cutter inserted on both sides;

Figure 1:
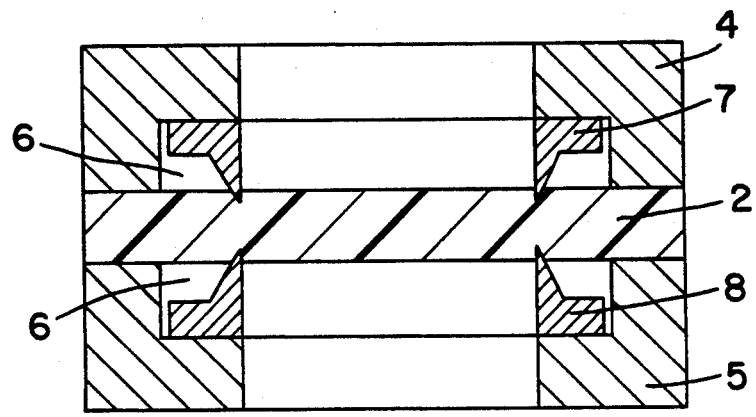
Figure 2:
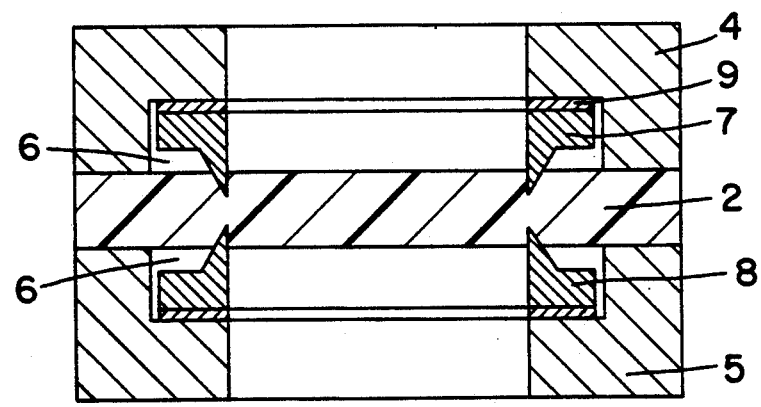
FIG. 2 is a cross section of a pressure relieving device with cutters and spacer discs inserted in both frame parts.
Figure 3:
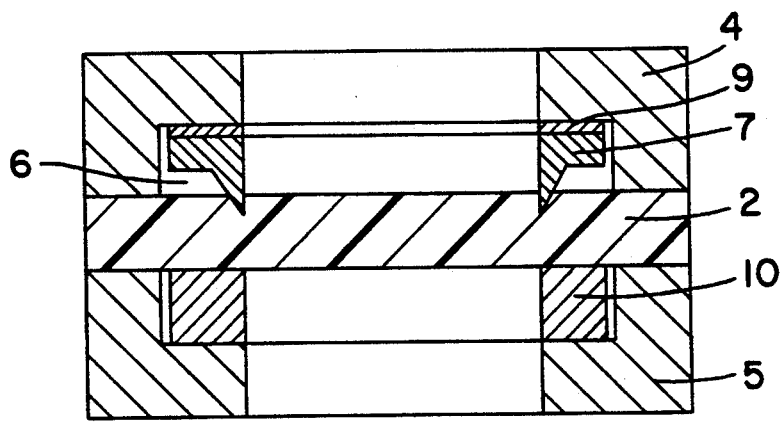
FIG. 3 is a cross section of a pressure relieving device with a cutter and a spacer disc inserted in one frame part and a block inserted in the other frame part.
Figure 4:
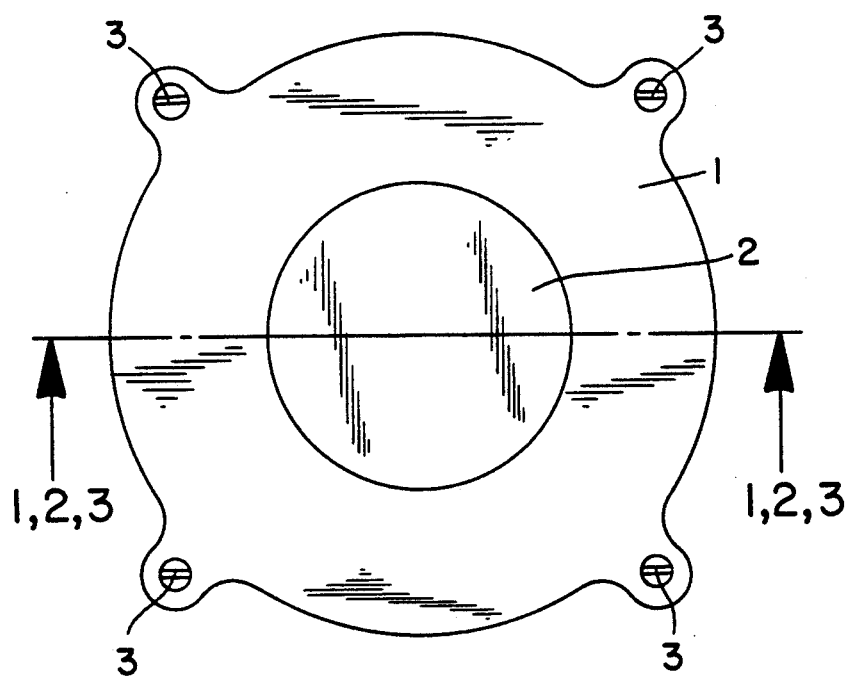
FIG. 4 is a plan view of a pressure relieving device with round frame and round rupture disc.

As can be seen in FIG. 4, the pressure relieving device according to the invention comprises frame 1, in which rupture disc 2 is clamped by screwbolts 3 disposed around the frame. FIGS. 1, 2, and 3 show frame 1 comprising two frame parts 4 and 5, which are provided with recesses 6. Recesses 6 serve to receive cutters 7 and 8 which, as seen in FIGS. 2 and 3, can be used in connection with spacer discs 9. Spacer discs 9 provide a certain cutter advancement, and consequently a certain response pressure, to be set. FIG. 3 shows an embodiment of the novel pressure relieving device wherein frame part 4 is provided with cutter 7 and frame part 5 contains block 10.

The novel pressure relieving device operates as follows:

In the normal state, rupture disc 2 is in the position shown in FIGS. 1, 2, and 3. If, in the case of the embodiments of FIGS. 1 and 2, the pressure changes to a value which corresponds to the set response pressure, rupture disc 2 bulges in one direction or the other, presses against cutter 7 or 8, and is cut out around its entire circumference by the cutter edge. In FIG. 3, an embodiment is represented wherein rupture disc 2 responds to a pressure change on one side, bulges in the direction of frame part 4 and, when the response pressure is reached, is cut out by cutter 7.

While only a limited number of specific embodiments of the present invention have been expressly disclosed, it is, nonetheless, to be broadly construed and not to be limited except by the character of the claims appended hereto.

I claim:

1. A pressure relieving device comprising a two-part frame including a first portion and a second portion, a rupture disc having a periphery and located between said first portion and said second portion and constituting a sealing surface, a recess having a floor in each of said first portion and said second portion, each said recess being open to said sealing surface and having a cutter thruin, there being a spacer between at least one of said cutter and said floor.

2. The device of claim 1 wherein said cutter has blades adjacent the periphery of said rupture disc.

3. The device of claim 1 wherein said cutter is provided with blades, a cutter plane is defined by cutting edges of said blades, a disc plane is defined by said rupture disc, and said cutter plane and said disc plane are substantially parallel.

4. The device of claim 1 wherein said cutter is provided with blades, a cutter plane is defined by cutting edges of said blades, a disc plane is defined by said rupture disc, and said cutter plane and said disc plane are not parallel.

5. The device of claim 1 wherein there is a spacer in each said recess between said cutter and said floor.

6. The device of claim 1 wherein said rupture disc has a predetermined weakened breaking point.

7. The device of claim 1 wherein said cutter extends around less than all of the periphery of said rupture disc.

* * * * *